US012602998B2

(12) United States Patent
Ran et al.

(10) Patent No.: US 12,602,998 B2
(45) Date of Patent: *Apr. 14, 2026

(54) DISTRIBUTED COMPUTING FOR AUTONOMOUS VEHICLES

(71) Applicant: CAVH LLC, Fitchburg, WI (US)

(72) Inventors: Bin Ran, Fitchburg, WI (US); Sicheng Fu, Fitchburg, WI (US); Rui Gan, Fitchburg, WI (US); Yang Cheng, Middleton, WI (US); Shen Li, Fitchburg, WI (US); Kexin Tian, Fitchburg, WI (US); Tianyi Chen, Fitchburg, WI (US); Shuoxuan Dong, Fitchburg, WI (US); Kunsong Shi, Fitchburg, WI (US); Haotian Shi, Fitchburg, WI (US); Xiaotian Li, Fitchburg, WI (US)

(73) Assignee: CAVH LLC, Fitchburg, WI (US)

(*) Notice: Subject to any disclaimer, the term of this patent is extended or adjusted under 35 U.S.C. 154(b) by 22 days.

This patent is subject to a terminal disclaimer.

(21) Appl. No.: 18/762,995

(22) Filed: Jul. 3, 2024

(65) Prior Publication Data

US 2024/0355203 A1 Oct. 24, 2024

Related U.S. Application Data

(63) Continuation of application No. 18/221,722, filed on Jul. 13, 2023, now Pat. No. 12,046,136, which is a (Continued)

(51) Int. Cl.

| | |
|---|---|
| ***G08G 1/0967*** | (2006.01) |
| ***G08G 1/01*** | (2006.01) |

(52) U.S. Cl.

CPC ..... *G08G 1/096783* (2013.01); *G08G 1/0116* (2013.01); *G08G 1/0145* (2013.01); *G08G 1/096708* (2013.01)

(58) Field of Classification Search

CPC .......... G08G 1/096783; G08G 1/0116; G08G 1/0145; G08G 1/096708

(Continued)

(56) References Cited

U.S. PATENT DOCUMENTS

| | | | | |
|---|---|---|---|---|
| 7,102,496 | B1 * | 9/2006 | Ernst, Jr. .......... | G08G 1/096725 340/436 |
| 7,421,334 | B2 * | 9/2008 | Dahlgren ........... | G01C 21/3691 701/408 |

(Continued)

OTHER PUBLICATIONS

SAE International Standard J3016 (2014), entitled "Taxonomy and Definitions for Terms Related to On-Road Motor Vehicle Automated Driving Systems". 2014. 12 pages.

(Continued)

*Primary Examiner* — Luis A Martinez Borrero

(74) *Attorney, Agent, or Firm* — Casimir Jones, SC; Thomas A. Isenbarger

(57) ABSTRACT

This invention presents an automated driving system with distributed computing (ADS-DC). During the operation of a connected automated vehicle (CAV), some or all of its automated driving capabilities for sensing, prediction, planning, decision-making, or control may be downgraded due to long-tail events or malfunctions. The intelligent roadside toolbox (IRT) functions as an edge server or a cloud, and can supplement CAV's sensing functions, prediction and management functions, planning and decision-making functions, and vehicle control functions by providing customized, on-demand, and dynamic computing resources and functions to the CAV. In addition, the IRT computing functions provide the computation support for sensing, prediction, planning, decision-making, and/or control functions of said CAV. Namely, the IRT functions as an edge server or a cloud to provide processing, training or optimization of CAV (Continued)

driving models as well as facilitate the implementation of the driving models in the CAV.

20 Claims, 9 Drawing Sheets

Related U.S. Application Data continuation of application No. 16/996,684, filed on Aug. 18, 2020, now Pat. No. 11,741,834.

(60) Provisional application No. 62/894,703, filed on Aug. 31, 2019.

(58) Field of Classification Search
USPC .............................................................. 701/23
See application file for complete search history.

(56) References Cited

U.S. PATENT DOCUMENTS

| | | | | |
|---|---|---|---|---|
| 7,554,435 | B2 * | 6/2009 | Tengler | B60Q 9/008 340/471 |
| 8,706,394 | B2 * | 4/2014 | Trepagnier | G01S 17/931 701/28 |
| 9,381,916 | B1 * | 7/2016 | Zhu | B60W 30/0956 |
| 10,019,904 | B1 * | 7/2018 | Chan | G06Q 10/0635 |
| 10,380,886 | B2 | 8/2019 | Ran et al. | |
| 10,595,175 | B2 | 3/2020 | de Oliveira et al. | |
| 10,692,365 | B2 | 6/2020 | Ran et al. | |
| 10,867,512 | B2 | 12/2020 | Ran et al. | |
| 10,991,242 | B2 * | 4/2021 | Taylor | H04Q 9/00 |
| 11,003,184 | B2 | 5/2021 | de Matos et al. | |
| 11,263,897 | B2 * | 3/2022 | Lepp | G08G 1/0116 |
| 11,293,765 | B2 * | 4/2022 | Tarkiainen | G08G 1/096811 |
| 11,323,249 | B2 | 5/2022 | Patil et al. | |
| 11,373,122 | B2 | 6/2022 | Jin et al. | |
| 11,436,923 | B2 | 9/2022 | Ran et al. | |
| 11,447,152 | B2 | 9/2022 | Ran et al. | |
| 11,495,126 | B2 | 11/2022 | Ding | |
| 11,741,834 | B2 * | 8/2023 | Ran | G08G 1/096708 701/23 |
| 11,842,642 | B2 | 12/2023 | Ran et al. | |
| 12,046,136 | B2 * | 7/2024 | Ran | G08G 1/0133 |
| 2010/0104138 | A1 * | 4/2010 | Fardi | G06V 20/58 382/106 |
| 2010/0256836 | A1 * | 10/2010 | Mudalige | G08G 1/22 701/25 |
| 2016/0189544 | A1 * | 6/2016 | Ricci | G08G 1/096725 701/117 |
| 2016/0323233 | A1 * | 11/2016 | Song | G08G 1/0141 |
| 2017/0020678 | A1 | 1/2017 | Lauf et al. | |
| 2017/0096074 | A1 * | 4/2017 | Ashton | B60L 50/10 |
| 2017/0131114 | A1 * | 5/2017 | Li | G08G 1/0967 |
| 2017/0195123 | A1 * | 7/2017 | Oberheide | H04L 9/14 |
| 2017/0206783 | A1 * | 7/2017 | Miller | G08G 1/0116 |
| 2017/0369055 | A1 * | 12/2017 | Saigusa | G08G 1/096775 |
| 2018/0004213 | A1 * | 1/2018 | Absmeier | H04L 67/104 |
| 2018/0018877 | A1 * | 1/2018 | Townsend | G08G 1/096783 |
| 2018/0025317 | A1 * | 1/2018 | Dominguez | G06Q 10/0832 705/332 |
| 2018/0176742 | A1 * | 6/2018 | Narayanan | G08G 1/096783 |
| 2018/0335781 | A1 * | 11/2018 | Chase | G08G 1/0133 |
| 2018/0336780 | A1 * | 11/2018 | Ran | G08G 1/07 |
| 2018/0375939 | A1 * | 12/2018 | Magalhães de Matos | H04L 67/61 |
| 2018/0376305 | A1 * | 12/2018 | Ramalho de Oliveira | H04W 4/44 |
| 2018/0376306 | A1 * | 12/2018 | Ramalho de Oliveira | G08G 1/0112 |
| 2019/0068434 | A1 * | 2/2019 | Moreira da Mota | G08G 1/052 |
| 2019/0096238 | A1 * | 3/2019 | Ran | G08G 1/164 |
| 2019/0123915 | A1 * | 4/2019 | Simplicio, Jr. | H04L 63/0823 |
| 2019/0171208 | A1 * | 6/2019 | Magalhães de Matos | G06N 20/00 |
| 2019/0193724 | A1 * | 6/2019 | Kim | G06V 20/54 |
| 2019/0206236 | A1 * | 7/2019 | Tao | G08G 1/08 |
| 2019/0244518 | A1 * | 8/2019 | Cheng | G05D 1/0088 |
| 2019/0244521 | A1 * | 8/2019 | Ran | G08G 1/0116 |
| 2019/0311614 | A1 * | 10/2019 | Yang | G08G 1/052 |
| 2019/0311616 | A1 * | 10/2019 | Jin | G05D 1/0297 |
| 2019/0347931 | A1 * | 11/2019 | Ding | G08G 1/0116 |
| 2019/0377341 | A1 * | 12/2019 | Choi | B60W 60/0011 |
| 2019/0392712 | A1 * | 12/2019 | Ran | G08G 1/0116 |
| 2020/0005633 | A1 * | 1/2020 | Jin | G08G 1/0125 |
| 2020/0019894 | A1 * | 1/2020 | Jin | G08G 1/0145 |
| 2020/0020227 | A1 * | 1/2020 | Ran | G08G 1/075 |
| 2020/0020228 | A1 * | 1/2020 | Cheng | G08G 1/096741 |
| 2020/0020234 | A1 * | 1/2020 | Cheng | G08G 1/0112 |
| 2020/0021961 | A1 * | 1/2020 | Li | G05D 1/0248 |
| 2020/0048634 | A1 * | 2/2020 | Djuranovic | C12N 15/67 |
| 2020/0174470 | A1 * | 6/2020 | Park | G05D 1/0061 |
| 2020/0175858 | A1 * | 6/2020 | Miranda | H04B 10/1141 |
| 2020/0239031 | A1 * | 7/2020 | Ran | G08G 1/0125 |
| 2020/0242930 | A1 * | 7/2020 | Ran | G08G 1/096725 |
| 2020/0322135 | A1 * | 10/2020 | Kupwade Patil | H04L 9/3268 |
| 2021/0005085 | A1 * | 1/2021 | Cheng | G08G 1/012 |
| 2021/0065547 | A1 * | 3/2021 | Ran | G08G 1/0145 |
| 2021/0311491 | A1 * | 10/2021 | Li | G08G 1/0116 |
| 2021/0314752 | A1 * | 10/2021 | Ran | G05D 1/247 |
| 2021/0394797 | A1 * | 12/2021 | Ran | B60W 60/0027 |
| 2022/0111858 | A1 * | 4/2022 | Ran | G06V 20/56 |
| 2022/0114885 | A1 * | 4/2022 | Ran | B60W 60/00 |
| 2022/0126864 | A1 * | 4/2022 | Moustafa | B60W 60/0013 |
| 2022/0171400 | A1 * | 6/2022 | Chen | G08G 1/0145 |
| 2022/0270476 | A1 * | 8/2022 | Ran | G05D 1/0287 |
| 2022/0281484 | A1 * | 9/2022 | Ran | H04W 4/44 |
| 2022/0332337 | A1 * | 10/2022 | Ran | B60W 60/001 |
| 2022/0375337 | A1 * | 11/2022 | Ran | G08G 1/096741 |
| 2022/0406178 | A1 * | 12/2022 | Ran | H04W 4/44 |
| 2022/0406184 | A1 | 12/2022 | Ran et al. | |
| 2023/0377461 | A1 * | 11/2023 | Ran | G08G 1/096708 |

OTHER PUBLICATIONS

SAE International Standard J3016 (2014). entitled “Taxonomy and Definitions for Terms Related to On-Road Motor Vehicle Automated Driving Systems” and updated in 2016 as J3016_201609. 30 pages.

International Search Report and Written Opinion issued for corresponding Application PCT/US2020/046835, mailed Nov. 18, 2020, 16 pages.

Extended European Search Report for EP 20856066.4, mailed Jun. 6, 2023, 11 pages.

* cited by examiner

DISTRIBUTED COMPUTING FOR AUTONOMOUS VEHICLES

This application is a continuation of U.S. application Ser. No. 18/221,722, filed Jul. 13, 2023, which is a continuation of U.S. application Ser. No. 16/996,684, filed Aug. 18, 2020, which claims priority to U.S. provisional patent application Ser. No. 62/894,703, filed Aug. 31, 2019, the entire contents of which are incorporated herein by reference for all purposes.

FIELD

Provided herein is technology related to a distributed driving system (DDS) that provides transportation management and operations and vehicle control for connected and automated vehicles (CAV) and intelligent road infrastructure systems (IRIS) and particularly, but not exclusively, to methods and systems for sending individual vehicles with customized, detailed, and time-sensitive control instructions and traffic information for automated vehicle driving, such as vehicle following, lane changing, route guidance, and other related information.

BACKGROUND

Autonomous vehicles equipped with an on-board unit (OBU) that sense their environment and navigate without human input, intervention, and/or control or with reduced human input, intervention, and/or control are in development. For instance, U.S. Pat. No. 7,421,334 describes an on-board intelligent vehicle system that comprises a sensor assembly to collect data and a processor to process the data to determine the occurrence of at least one event. U.S. Pat. No. 7,554,435 describes an on-board unit for a host vehicle that is configured to communicate with other vehicles to alert a driver of a potential braking situation in a preceding vehicle. Despite these advances, OBU-equipped autonomous vehicles are not in widespread commercial use, primarily because existing approaches for autonomous driving require expensive and complicated on-board systems, thus making widespread implementation a substantial challenge. Further, existing OBU technologies are communication modules limited to transferring information with other vehicles or infrastructures. Accordingly, conventional technologies are designed to provide an autonomous driving vehicle system and do not provide a technology for a connected automated vehicle highway system. Accordingly, new technologies would improve automated driving for connected and automated autonomous vehicles.

SUMMARY

Provided herein is technology related to a distributed driving system (DDS) that provides transportation management and operations and vehicle control for connected and automated vehicles (CAV) and intelligent road infrastructure systems (IRIS) and particularly, but not exclusively, to methods and systems for sending individual vehicles with customized, detailed, and time-sensitive control instructions and traffic information for automated vehicle driving, such as vehicle following, lane changing, route guidance, and other related information. In some embodiments, the present technology incorporates aspects of U.S. patent application Ser. No. 15/628,331, which is incorporated by reference and that provides a system-oriented and fully-controlled automated vehicle highway (CAVH) system for various levels of connected and automated vehicles and highways. In some embodiments, the present technology incorporates aspects of U.S. patent application Ser. No. 16/267,836, which is incorporated by reference and that provides systems and methods for an Intelligent Road Infrastructure System (IRIS) configured to provide vehicle operations and control for connected automated vehicle highway (CAVH) systems.

In some embodiments, the technology provided herein provides a distributed driving system (DDS) comprising an intelligent roadside toolbox (IRT) that provides modular access to CAVH and IRIS technologies (e.g., services) according to the automated driving needs of a particular vehicle. For example, in some embodiments, the IRT of the DDS technologies described herein provides a flexible and expandable service for vehicles at different automation levels. In some embodiments, the services provided by the IRT are dynamic and customized for particular vehicles, for vehicles produced by a particular manufacturer, for vehicles associated by a common industry alliance, for vehicles subscribing to a DDS to obtain services from the IRT, etc. While CAVH technologies relate to centralized systems configured to provide individual vehicles with customized, detailed, and time-sensitive control instructions and traffic information to all vehicles using the CAVH system for automated vehicle driving regardless of vehicle capability and/or automation level and thus provide a homogeneous service, the DDS and IRT technologies described herein are vehicle-oriented, modular, and customizable for each vehicle to meet the specific needs of each individual vehicle as an on-demand and dynamic service.

Accordingly, in some embodiments, the technology described herein provides a distributed driving system (DDS). In some embodiments, the DDS comprises: 1) one or more connected and automated vehicles (CAVs) comprising a vehicle onboard system; 2) an intelligent roadside toolbox (IRT); and 3) communications media (e.g., wireless communications (e.g., real-time wireless communications media)) for transmitting data between the CAVs and the IRT, wherein a vehicle onboard system is configured to generate control instructions for automated driving of a CAV comprising the vehicle onboard system; and wherein the IRT provides customized, on-demand, and dynamic IRT functions to individual CAVs for system security and backup, vehicle performance optimization, computing and management, and dynamic utility management (DUM) and information provision. In some embodiments, the DDS is configured to provide on-demand and dynamic IRT functions to individual CAVs to avoid trajectory conflicts with other vehicles (e.g., collision avoidance) and/or to adjust vehicle route and/or trajectory for abnormal driving environments (e.g., weather events, natural disasters, traffic accidents, etc.) In some embodiments, the DDS comprises a DUM module configured to optimize use of resources by CAVs at various vehicle intelligence levels by performing a method comprising assembling IRT functions to provide to CAVs; and balancing CAV onboard system costs. In some embodiments, the CAV onboard system costs comprise computation ability cost (C), number of computational units cost (NU), fuel consumption cost (P), and climate control and/or driver comfort (e.g., acceleration and/or deceleration) cost (V). In some embodiments, the DUM module is configured to optimize resources by CAVs at various vehicle intelligence levels by optimizing a cost function (e.g., identifying an optimal minimum of the cost function) describing the total cost to implement an automated driving system as a sum of functions (e.g., functions providing positive values) for computation ability cost (C), number of computational units cost (NU), fuel consumption cost (P), climate control and/or driver comfort (e.g., acceleration and/or deceleration) cost (V), and/or IRT cost (I).

In some embodiments, the IRT provides customized, on demand, and dynamic IRT functions to improve safety and stability of individual CAVs according to the needs of individual CAVs by assembling IRT functions and providing IRT functions to individual CAVs. In some embodiments, the DDS is configured to measure the performance of a CAV according to an index describing the computational ability of the CAV, the emission output of the CAV, the energy consumption of the CAV, and/or the comfort of a driver of the CAV. In some embodiments, computational ability comprises computation speed for sensing, prediction, decision-making, and/or control; energy consumption comprises fuel economy and/or electricity economy; and the comfort of the driver comprises climate control and/or acceleration/deceleration of the CAV.

In some embodiments, the DDS is configured to provide a customized IRT to supplement an individual CAV according to vehicle manufacturer designs to improve CAV performance. In some embodiments, the DDS is configured to provide supplemental functions to an individual CAV in response to the value of a vehicle cost function exceeding a threshold and/or in response to detecting a component, function, and/or service failure. In some embodiments, the IRT is configured to provide a customized service for vehicle manufacturers and/or driving services providers, the customized service comprising remote-control service, pavement condition detection, and/or pedestrian prediction. In some embodiments, the IRT is configured to receive information from a vehicle OBU, electronic stability program (ESP), and/or vehicle control unit (VCU).

In some embodiments, the DDS is configured to determine CAV information and/or functional requirements based on a cost function describing the total cost to implement an automated driving system as a sum of functions for computation ability cost (C), number of computational units cost (NU), fuel consumption cost (P), climate control and/or driver comfort (e.g., acceleration and/or deceleration) cost (V), and/or IRT cost (I); and send the information and/or functional requirements to the IRT for providing supplemental information and/or functions to a CAV.

In some embodiments, the DDS is configured to integrate sensor and/or driving environment information from different resources to provide integrated sensor and/or driving environment information and pass the integrated sensor and/or driving environment information to a prediction module. In some embodiments, the DDS is configured to provide customized, on-demand, and dynamic IRT functions to individual CAVs for sensing, transportation behavior prediction and management, planning and decision-making, and/or vehicle control. In some embodiments, sensing comprises providing information in real-time, short-term, and/or long-term for transportation behavior prediction and management, planning and decision-making, and/or vehicle control. In some embodiments, the DDS is configured to provide system security and backup, vehicle performance optimization, computing and management, and dynamic utility management for a CAV. In some embodiments, the DDS is configured to provide customized, on-demand, and dynamic IRT sensing functions for automated driving of a CAV using information obtained from the CAV and/or other CAVs and/or information obtained from the IRT. In some embodiments, the DDS is configured to provide customized, on-demand, and dynamic IRT transportation behavior prediction and management functions for automated driving of a CAV, wherein the transportation behavior prediction and management functions predict the behavior of surrounding vehicles, pedestrians, bicycles, and other moving objects.

In some embodiments, the transportation behavior prediction and management functions provide prediction support comprising providing raw data and/or providing features extracted from raw data; and/or a prediction result, wherein prediction support and/or a prediction result is/are provided to a CAV based on the prediction requirements of the CAV. In some embodiments, the DDS is configured to provide customized, on-demand, and dynamic IRT planning and decision-making functions for automated driving of a CAV. In some embodiments, the planning and decision-making functions provide path planning comprising identifying and/or providing a detailed driving path at a microscopic level for automated driving of a CAV; route planning comprising identifying and/or providing a route for automated driving of a CAV; special condition planning comprising identifying and/or providing a detailed driving path at a microscopic level and/or a route for automated driving of a CAV during special weather conditions or event conditions; and/or disaster solutions comprising identifying and/or providing a detailed driving path at a microscopic level and/or a route for automated driving of a CAV during a disaster, wherein path planning, route planning, special condition planning, and/or disaster solutions is/are provided to a CAV based on the planning and decision-making requirements of the CAV.

In some embodiments, the DDS comprises a control module and a decision-making module. In some embodiments, the DDS is configured to provide customized, on-demand, and dynamic IRT vehicle control functions for automated driving of a CAV. In some embodiments, the vehicle control functions are supported by customized, on-demand, and dynamic IRT sensing functions; customized, on-demand, and dynamic IRT transportation behavior prediction and management functions; and/or customized, on-demand, and dynamic IRT planning and decision-making functions. In some embodiments, vehicle control functions provide lateral control, vertical control, platoon control, fleet management, and system failure safety measures for a CAV. In some embodiments, system failure safety measures are configured to provide sufficient response time for drivers to assume control of a vehicle during system failure and/or to stop vehicles safely. In some embodiments, the vehicle control functions are configured to determine the computation resources supporting automated driving of a CAV and request and/or provide supplemental computation resources from the IRT. In some embodiments, the control module is configured to integrate and/or process information provided by the decision-making module and to send vehicle control commands to CAVs for automated driving of the CAVs.

In some embodiments, the DDS is configured to determine an optimal vehicle power consumption and driver comfort for an individual CAV to minimize power consumption and emissions and send the optimal vehicle power consumption and driver comfort to the CAV using the communications media.

In some embodiments, the IRT comprises hardware modules, the hardware modules comprising a sensing module comprising sensors, a communications module, and/or a computation module. In some embodiments, the IRT comprises software modules, the software modules comprising sensing software configured to use information from a sensing module to provide object detection and mapping; and decision-making software configured to provide paths, routes, and/or control instructions for CAVs.

In some embodiments, DDS is configured to provide system backup and redundancy services for individual CAVs, wherein the provide system backup and redundancy services provide backup and/or supplemental sensing devices for individual CAVs requiring sensing support; and/or backup and/or supplemental computational resources for individual CAVs to maintain CAV performance levels. In some embodiments, the DDS is configured to provide system backup and redundancy services for individual CAVs using the communications media. In some embodiments, the DDS is configured to collect sensor data describing the environment of a CAV; and provide at least a subset of the sensor data to a CAV to supplement a malfunctioning and/or deficient sensor system of the CAV to maximize proper functioning of the CAV. In some embodiments, the sensor data is provided by an IRT sensing module. In some embodiments, the sensor data and the at least a subset of the sensor data are communicated between the DDS and the CAV over the communications medium. In some embodiments, the sensor data comprises information describing road conditions, traffic signs and/or signals, and objects surrounding the CAV. In some embodiments, the DDS is further configured to integrate the data; provide the data to a prediction, planning, and decision-making system; store the data; and/or retrieve the at least a subset of data.

Also provided herein are methods employing any of the systems described herein for the management of one or more aspects of automated driving of a CAV. The methods include those processes undertaken by individual participants in the system (e.g., drivers, public or private local, regional, or national transportation facilitators, government agencies, etc.) as well as collective activities of one or more participants working in coordination or independently from each other.

Some portions of this description describe the embodiments of the technology in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the technology may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory, tangible computer readable storage medium or any type of media suitable for storing electronic instructions, which may be coupled to a computer system bus. Furthermore, any computing systems referred to in the specification may include a single processor or may be architectures employing multiple processor designs for increased computing capability.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings.

Figure 1:
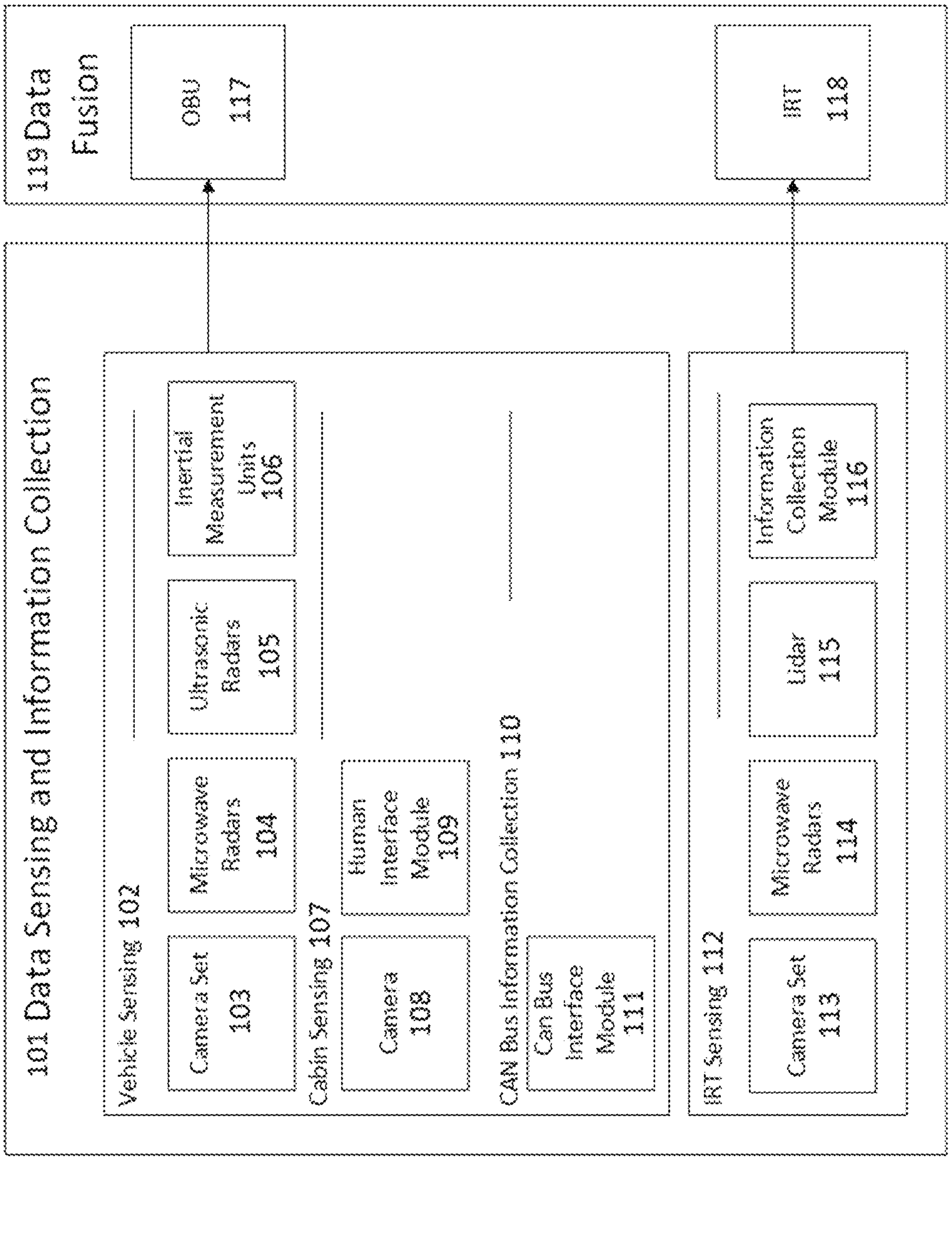
FIG. 1 is a schematic drawing showing data flows from sensors and/or information collecting modules to data fusion units (e.g., OBU and IRT).

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology related to a distributed driving system (DDS) that provides transportation management and operations and vehicle control for connected and automated vehicles (CAV) and intelligent road infrastructure systems (IRIS) and particularly, but not exclusively, to methods and systems for sending individual vehicles with customized, detailed, and time-sensitive control instructions and traffic information for automated vehicle driving, such as vehicle following, lane changing, route guidance, and other related information.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "controller-free" system does not comprise a controller, a "sensing-free" method does not comprise a sensing step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, a "system" refers to a plurality of real and/or abstract components operating together for a common purpose. In some embodiments, a "system" is an integrated assemblage of hardware and/or software components. In some embodiments, each component of the system interacts with one or more other components and/or is related to one or more other components. In some embodiments, a system refers to a combination of components and software for controlling and directing methods.

As used herein, the term "support" when used in reference to one or more components of the DDS providing support to and/or supporting one or more other components of the DDS refers to, e.g., exchange of information and/or data between components and/or levels of the of the DDS, sending and/or receiving instructions between components and/or levels of the of the DDS, and/or other interaction between components and/or levels of the DDS that provide functions such as information exchange, data transfer, messaging, and/or alerting.

As used herein, the term "autonomous vehicle" or "AV" refers to an autonomous vehicle, e.g., at any level of automation (e.g., as defined by SAE International Standard J3016 (2014), incorporated herein by reference).

As used herein, the term "connected vehicle" or "CV" refers to a connected vehicle, e.g., configured for any level of communication (e.g., V2V, V2I, and/or I2V).

As used herein, the term "connected and autonomous vehicle" or "CAV" refers to an autonomous vehicle that is able to communicate with other vehicles (e.g., by V2V communication), with roadside units (RSUs), an IRT, traffic control signals, and other infrastructure or devices. That is, the term "connected autonomous vehicle" or "CAV" refers to a connected autonomous vehicle having any level of automation (e.g., as defined by SAE International Standard J3016 (2014)) and communication (e.g., V2V, V2I, and/or I2V).

As used herein, the term "data fusion" refers to integrating a plurality of data sources to provide information (e.g., fused data) that is more consistent, accurate, and useful than any individual data source of the plurality of data sources.

In some embodiments, various spatial and temporal scales or levels are used herein, e.g., microscopic, mesoscopic, and macroscopic. As used herein, the "microscopic level" refers to a scale relevant to individual vehicles and movements of individual vehicles (e.g., longitudinal movements (car following, acceleration and deceleration, stopping and standing) and/or lateral movements (lane keeping, lane changing)). As used herein, the "mesoscopic level" refers to a scale relevant to road corridors and segments and movements of groups of vehicles (e.g., special event early notification, incident prediction, weaving section merging and diverging, platoon splitting and integrating, variable speed limit prediction and reaction, segment travel time prediction, and segment traffic flow prediction). As used herein, the term "macroscopic level" refers to a scale relevant for a road network (e.g., route planning, congestion, incidents, network traffic). As used herein, the term "microscopic level", when referring to a temporal scale, refers to a time of approximately 1 to 10 milliseconds (e.g., relevant to vehicle control instruction computation). As used herein, the term "mesoscopic level", when referring to a temporal scale, refers to a time of approximately 10 to 1000 milliseconds (e.g., relevant to incident detection and pavement condition notification). As used herein, the term "macroscopic level", when referring to a temporal scale, refers to a time that is approximately longer than 1 second (e.g., relevant to route computing).

As used herein, the term "automation level" refers to a level in a classification system describing the amount of driver intervention and/or attentiveness required for an AV, CV, and/or CAV. In particular, the term "automation level" refers to the levels of SAE International Standard J3016 (2014)) entitled "Taxonomy and Definitions for Terms Related to On-Road Motor Vehicle Automated Driving Systems" and updated in 2016 as J3016_201609, each of which is incorporated herein by reference. The SAE automation levels are briefly described as Level 0: "no automation" (e.g., a fully manual vehicle with all aspects of driving being human and manually controlled), Level 1: "driver assistance" (e.g., a single automated aspect such as steering, speed control, or braking control), Level 2: "partial automation" (e.g., human control with automated control of steering and acceleration/deceleration), Level 3: "conditional automation" (e.g., vehicles make informed decisions and human assumes control when the vehicle cannot execute a task), Level 4: "high automation" (e.g., vehicles make informed decisions and human is not required to assume control when the vehicle cannot execute a task), and Level 5: "full automation" (e.g., vehicles do not require human attention).

As used herein, the term "configured" refers to a component, module, system, sub-system, etc. (e.g., hardware and/or software) that is constructed and/or programmed to carry out the indicated function.

As used herein, the terms "determine," "calculate," "compute," and variations thereof, are used interchangeably to any type of methodology, processes, mathematical operation, or technique.

As used herein, the term "vehicle" refers to any type of powered transportation device, which includes, and is not limited to, an automobile, truck, bus, motorcycle, or boat. The vehicle may normally be controlled by an operator or may be unmanned and remotely or autonomously operated in another fashion, such as using controls other than the steering wheel, gear shift, brake pedal, and accelerator pedal.

DESCRIPTION

Provided herein is technology for a distributed driving system (DDS). The technology facilitates vehicle operations and control for individual connected automated vehicles (CAVs). The DDS provides vehicles with individually customized information and real-time control instructions for vehicles to fulfill the driving tasks of car following, lane changing, and/or route guidance. In some embodiments, the DDS provides transportation operations and management services for freeways and urban arterials.

In some embodiments, the DDS comprises one or more CAVs and an intelligent roadside toolbox (IRT) and performs methods for dynamic utility management (DUM). The DDS provides and/or supplements one or more of the following function categories for automated driving by CAVs: sensing, transportation behavior prediction and management, planning and decision-making, and vehicle control. In some embodiments, the DDS is supported by real-time wired and/or wireless communication, power supply networks, cloud resources, cyber safety, and security services.

In some embodiments, the DDS comprises an intelligent roadside toolbox (IRT) and communications media for transmitting data between connected and automated vehicles CAVs and the IRT. According to the DDS technology, a CAV onboard system is configured to generate control instructions for the automated driving of a CAV comprising the onboard system and the IRT provides customized, on-demand, and dynamic IRT functions to individual CAVs for system security and backup, vehicle performance optimization, computing and management, and dynamic utility management (DUM) and information provision.

In some embodiments, DDS is configured to provide dynamic utility management (DUM) as a function. In some embodiments, the DDS comprises a module (e.g., software and/or hardware) that provides DUM. In some embodiments, the DDS is configured to perform DUM methods. As described herein, the DUM maintains the optimal utility of CAVs (e.g., CAVs at various vehicle intelligence levels). For example, a CAV operating at a first automation level (e.g., SAE Level 3) may experience a downgrade of the automation level to a second automation level (e.g., from SAE Level 3 to SAE Level 2) when the driving environment of the CAV changes (e.g., the CAV enters a complex environment (e.g., comprising many moving objects, complex road geometry, weather events, etc.)) According to embodiments of the technology provided herein, DUM addresses the change in SAE automation level by assembling resources from the IRT (e.g., computational resources, system security and backup resources, sensing resources, transportation behavior prediction and management resources, planning and decision-making resources, and/or vehicle control resources and/or instructions) to maintain the CAV automation level at the first level.

Thus, in some embodiments, the DUM manages the utilities and resources provided by CAVs and provided by the DDS (e.g., IRT), e.g., to supplement CAV utility and resources. Accordingly, DUM balances costs among all utilities of CAV onboard systems. In some embodiments, DUM balances costs using a cost function, e.g., as provided below:

$$U = f_1(C) + f_2(NU) + f_3(P) + f_4(V) + f_5(I)$$

where U represents the total implementation cost of an automated driving system, $f_1(C)$ is a function describing the computation ability cost, $f_2(NU)$ is a function describing the number of units cost, $f_3(P)$ is a function describing the fuel consumption cost, $f_4(V)$ is a function describing the climate control and/or driver comfort (e.g., acceleration and/or deceleration) cost, and $f_5(I)$ is a function describing the IRT cost. Thus, the cost function provides a measure of the cost to achieve automated driving. The cost computation ability cost is a positive value that includes, e.g., the computation speed and accuracy for sensing, transportation behavior prediction and management, planning and decision-making, and vehicle control. The number of units cost is a positive value that refers to the number of processors (e.g., GPUs, CPUs) that are used for automated driving. The fuel consumption cost is a positive value that refers to the fuel or electricity cost of automated driving. The climate control cost is a positive value that represents the costs to provide driver comfort, e.g., temperature control and/or smooth acceleration and/or deceleration of the CAV. The IRT cost represents the cost to provide services from IRT.

Optimization of the cost function comprises identifying an optimal minimum of the value of the cost function (U) that is a sum of positive values provided by the cost functions for computation ability cost, number of units cost, fuel consumption cost, and climate control and/or driver comfort (e.g., acceleration and/or deceleration) cost. The value of the cost function and the value of the optimal minimum for the cost function are dynamic, e.g., changing as driving circumstances, cost functions, and demands of the automated driving system change. The cost functions are continuously monitored and the cost function is continuously monitored to identify an optimal (e.g., optimal minimum) value for the driving circumstances and demands of the automated driving system. According to embodiments of the DDS technology provided herein, the IRT provides support to CAVs to assist in minimizing costs of automated driving, to balance costs of automated driving, and to facilitate an optimal minimal value for the cost function.

Thus, the cost function is used to evaluate the performance of a CAV by considering a plurality of costs and calculate the generalized cost to achieve automated driving. In some embodiments, the DDS technology determines the services to provide to a CAV (e.g., from the IRT) based on the cost function. For example, when the computation cost for an individual CAV is significantly increasing, the CAV sends a request to the DDS for supplemental computational resources. The DDS then provides the supplemental resources to the CAV from the IRT. As an additional example, a driver in a CAV experiencing hot weather may want to turn on the air conditioner, which would reduce the driving distance for the CAV due to the extra power requirement of the air conditioner that would shift resources used for automated driving. Transfer of power resources from the modules supporting the CAV automation level to the air conditioning would decrease the operational automation level of the CAV. According to embodiments of the technology, DUM requests resources from the IRT to supplement the modules supporting the CAV automation level and maintain the automation level at the original level. In particular embodiments, the CAV can place some offline while maintaining the automation driving lever by using resources from IRT.

Accordingly, embodiments of the technology provided herein relate to a DDS and IRT that provide dynamic and customizable services to individual vehicles based on requirements identified by an auto manufacturer, industry alliance, driver subscription to the DDS, identification of CAV resource needs by the DDS, etc. The IRT of the DDS provides a flexible and expandable service for CAVs (e.g., CAVs at different automation levels). The IRT is vehicle oriented to support the automated driving of CAVs. For example, a CAV operating at a first automation level can request supplemental services from the IRT to operate at a higher automation level.

In some embodiments, e.g., as shown in FIG. 1, the technology 101 comprises data flows, e.g., between sensors 102-109, 112-115 and/or information collecting modules 110, 116 and data fusion modules (e.g., an OBU 117 and/or the IRT 118). In some embodiments, a vehicle subsystem collects vehicle sensor data from sensors on the exterior of the CAV, cabin passenger data from sensors in the interior of the CAV, and/or basic safety messages from a controller area network (CAN) bus interface 111. In some embodiments, vehicle sensor data, cabin passenger data, and/or basic safety messages data are sent to an OBU 117 for data fusion 119. In some embodiments, the IRT 118 collects roadside sensor data, e.g., using sensors mounted on IRT 118. In some embodiments, sensor data are sent to the IRT 118 for data fusion 119.

In some embodiments, a CAV comprises an on-board unit (OBU) that communicates with a vehicle infrastructure coordination transportation system, e.g., a DDS and/or CAVH system. In some embodiments, the OBU comprises sensing modules to sense and characterize the driving environment and components configured to communicate with other vehicles and/or infrastructure components (e.g., IRT and/or components of a CAVH system). In some embodiments, the OBU transmits sensor data to an IRT and/or a component of a CAVH system. In some embodiments, an OBU comprises a component (e.g., a vehicle control module or vehicle control unit) that interfaces with the mechanical components of a CAV to provide mechanical control of a CAV according to control instructions provided by the OBU, by the OBU and IRT, and/or by the IRT. In some embodiments, an OBU communicates with a component (e.g., a vehicle control module or vehicle control unit) that interfaces with the mechanical components of a CAV to provide mechanical control of a CAV according to control instructions provided by the OBU, by the OBU and IRT, and/or by the IRT.

In some embodiments, the OBU comprises a communication module configured to communicate with an IRT. In some embodiments, the OBU comprises a communication module configured to communicate with another OBU. In some embodiments, the OBU comprises a data collection module configured to collect data from external vehicle sensors and/or internal vehicle sensors; and to monitor vehicle status and driver status. In some embodiments, the OBU comprises a vehicle control module configured to execute control instructions for driving tasks. In some embodiments, the driving tasks comprise car following and/or lane changing. In some embodiments, the control instructions are received from an IRT. In some embodiments, the OBU is configured to control a vehicle (e.g., by producing control instructions) using data and information received from an IRT. In some embodiments, the data received from an IRT comprises: vehicle control information and/or instructions; travel route and traffic information; and/or services information. In some embodiments, the vehicle control instructions comprise a longitudinal acceleration rate, a lateral acceleration rate, and/or a vehicle orientation. In some embodiments, the travel route and traffic information comprise traffic conditions, incident location, intersection location, entrance location, and/or exit location. In some embodiments, the services data comprises the location of a fuel station and/or location of a point of interest. In some embodiments, OBU is configured to send data to an IRT. In some embodiments, the data sent to said IRT comprises: utility and/or cost information; driver input data; driver condition data; and/or vehicle condition data. In some embodiments, the driver input data comprises origin of the trip, destination of the trip, expected travel time, and/or service requests. In some embodiments, the driver condition data comprises driver behaviors, fatigue level, and/or driver distractions. In some embodiments, the vehicle condition data comprises vehicle ID, vehicle type, and/or data collected by a data collection module. In some embodiments, the OBU is configured to collect data comprising: vehicle engine status; vehicle speed; surrounding objects detected by vehicles; and/or driver conditions. In some embodiments, the OBU is configured to assume control of a vehicle.

Figure 2:
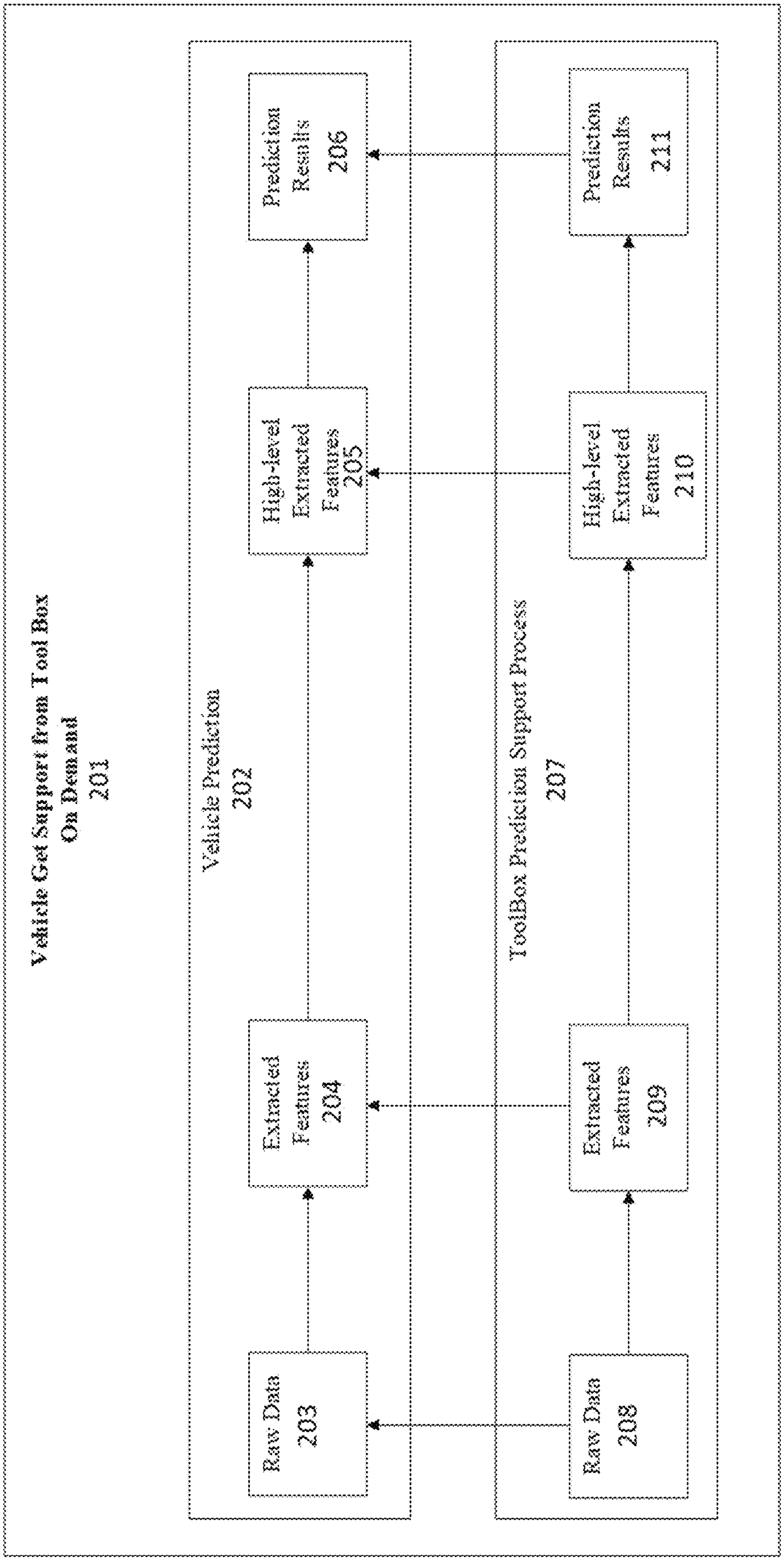
FIG. 2 is a schematic drawing showing IRT-supported on demand prediction functions provided to vehicles.

In some embodiments, e.g., as shown in FIG. 2, CAV prediction functions 202 are supplemented by the IRT 207. Prediction is a complex process that extracts useful information from data (e.g., sensor data provided by CAV and/or IRT sensors). In some embodiments, features are extracted from raw data 203, high-level features 205 are extracted from the features 204, and a prediction 206 is produced from the high-level features. In some embodiments, the CAVs and the IRT both perform extracting features from raw data 203, 208, extracting high-level features 205, 210 from the features 204, 209, and producing a prediction 206, 211 from the high-level features 205, 210. In some embodiments, CAVs receive supplemental prediction services from the IRT for extracting features from raw data 208, extracting high-level features 210 from the features 209, and producing a prediction 211 from the high-level features 210 according to the prediction requirements of the CAV and/or requests for supplemental prediction services made by the CAV to the IRT.

Figure 3:
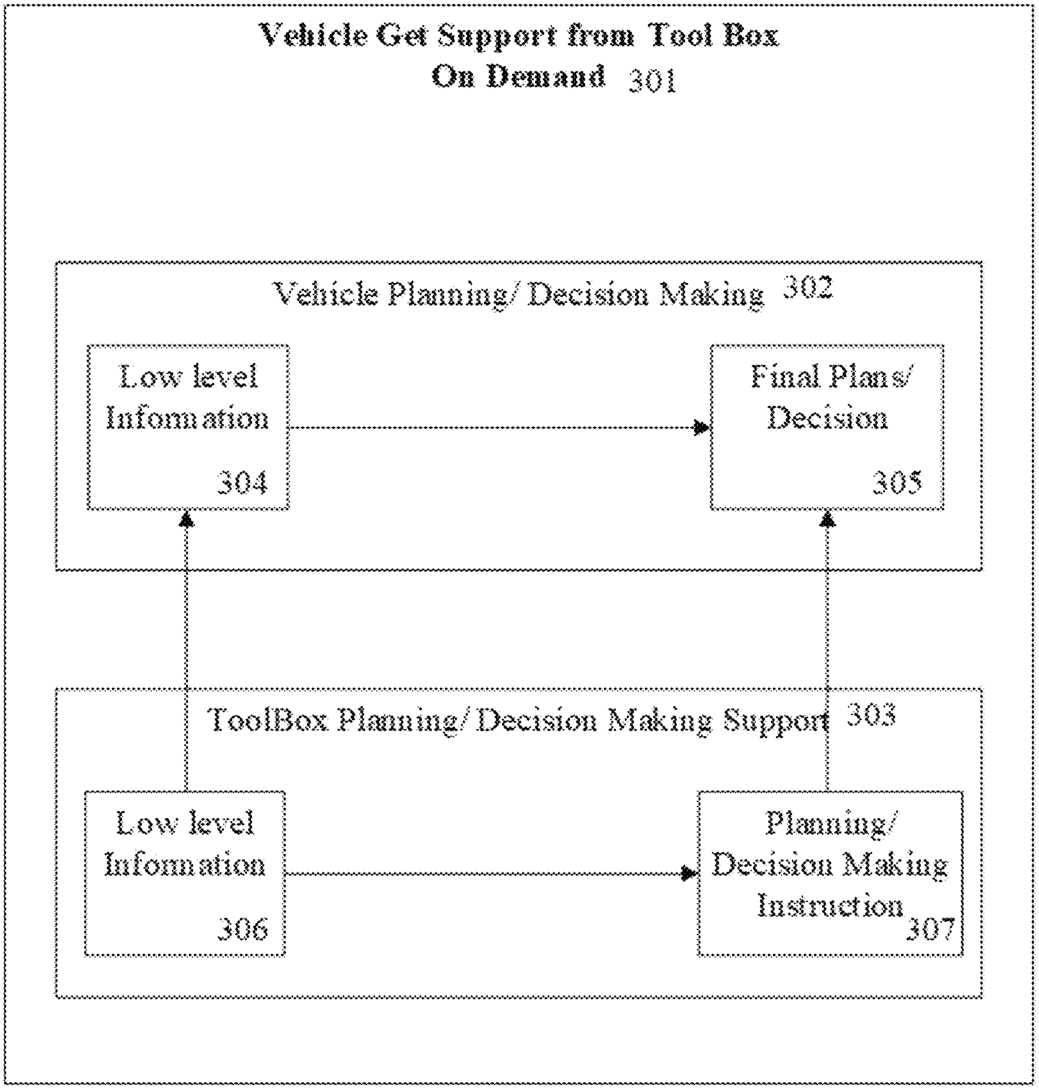
FIG. 3 is a schematic drawing showing IRT-supported on-demand planning and decision functions provided to vehicles.

In some embodiments, e.g., as shown in FIG. 3, CAV planning and decision-making functions 302 are supplemented by the IRT 303. Planning and decisions are produced using low-level information 304 306 (e.g., sensor data, congestion level). In some embodiments, the CAVs and the IRT both perform planning and decision-making. In some embodiments, CAVs receive supplemental planning and decision-making services 307 from the IRT according to the planning and decision-making requirements of the CAV and/or requests for supplemental planning and decision-making services made by the CAV to the IRT.

Figure 4:
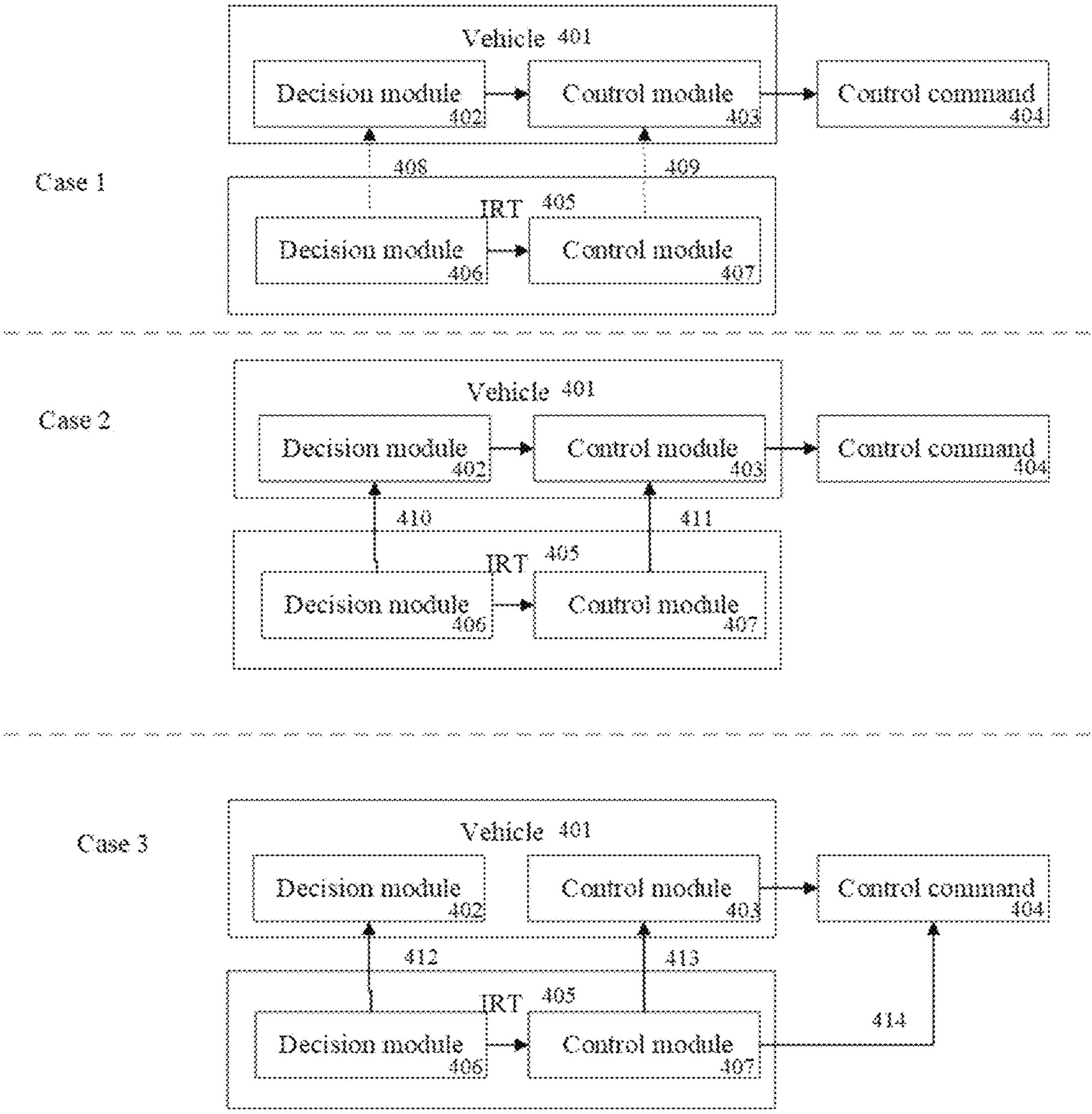
FIG. 4 is a schematic drawing showing vehicle control functions provided by the DDS.

In some embodiments, e.g., as shown in FIG. 4, the DDS provides systems and methods for CAV control. FIG. 4 shows three exemplary cases of DDS providing CAV control and/or support for CAV control. In some embodiments (e.g., Case 1), a control module 403 for a CAV 401 does not have sufficient information to provide adequate automated driving control instructions for the driving environment and the IRT 405 provides supplemental control support 408 409 (e.g., information and/or resources) to the CAV 401 for the CAV 401 to produce adequate automated driving control instructions for the driving environment. In some embodiments (e.g., Case 2), a control module for a CAV 401 cannot provide adequate automated driving control instructions for the driving environment and the IRT 405 provides customized control information 410 411 to the CAV 401 for the CAV 401 to produce adequate automated driving control instructions for the driving environment. In some embodiments (e.g., Case 3), the IRT 405 replaces the role of a malfunctioning control module and/or the IRT 405 directly sends control commands 404 to the vehicle.

Figure 5:
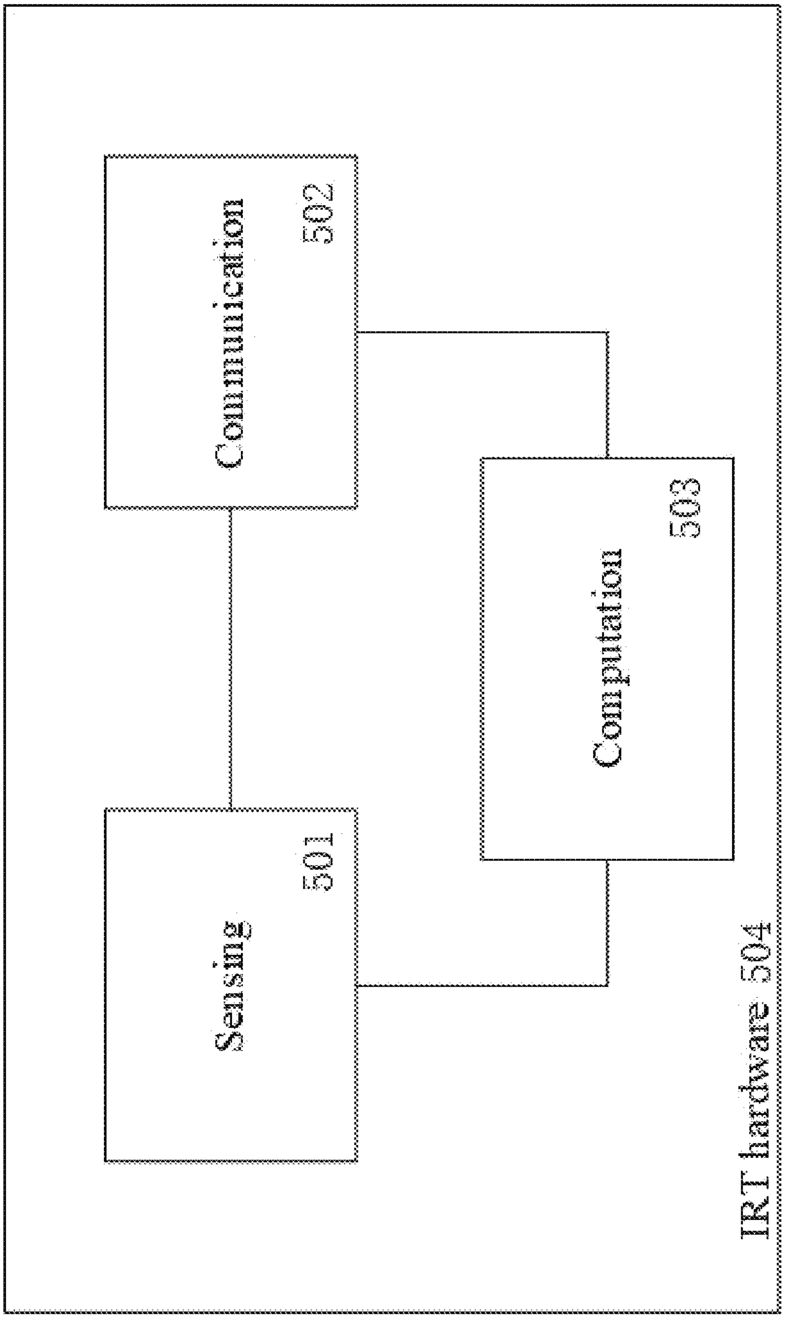
FIG. 5 is a schematic drawing showing components of IRT hardware.
Figure 6:
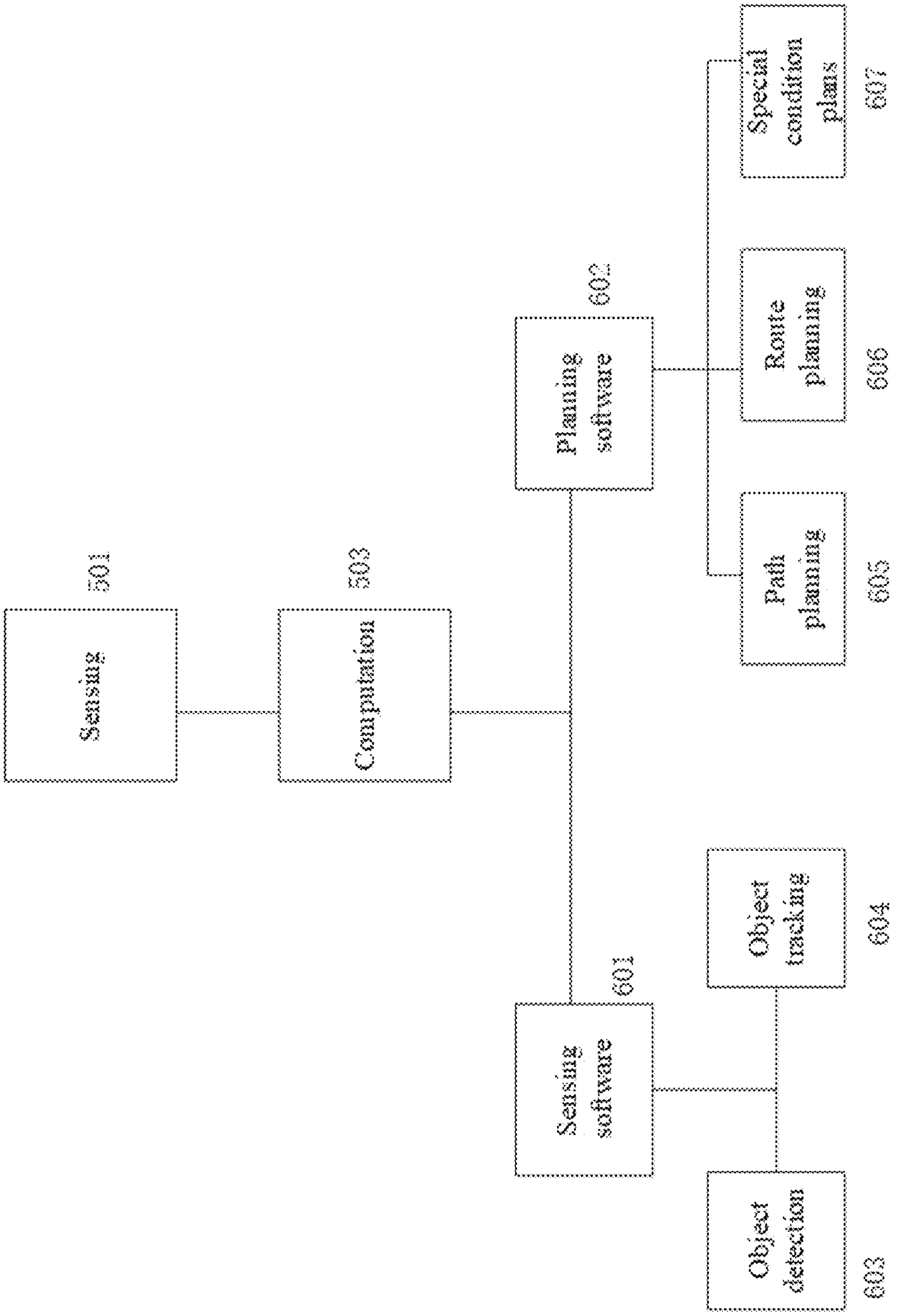
FIG. 6 is a schematic drawing showing components of IRT software.
Figure 7:
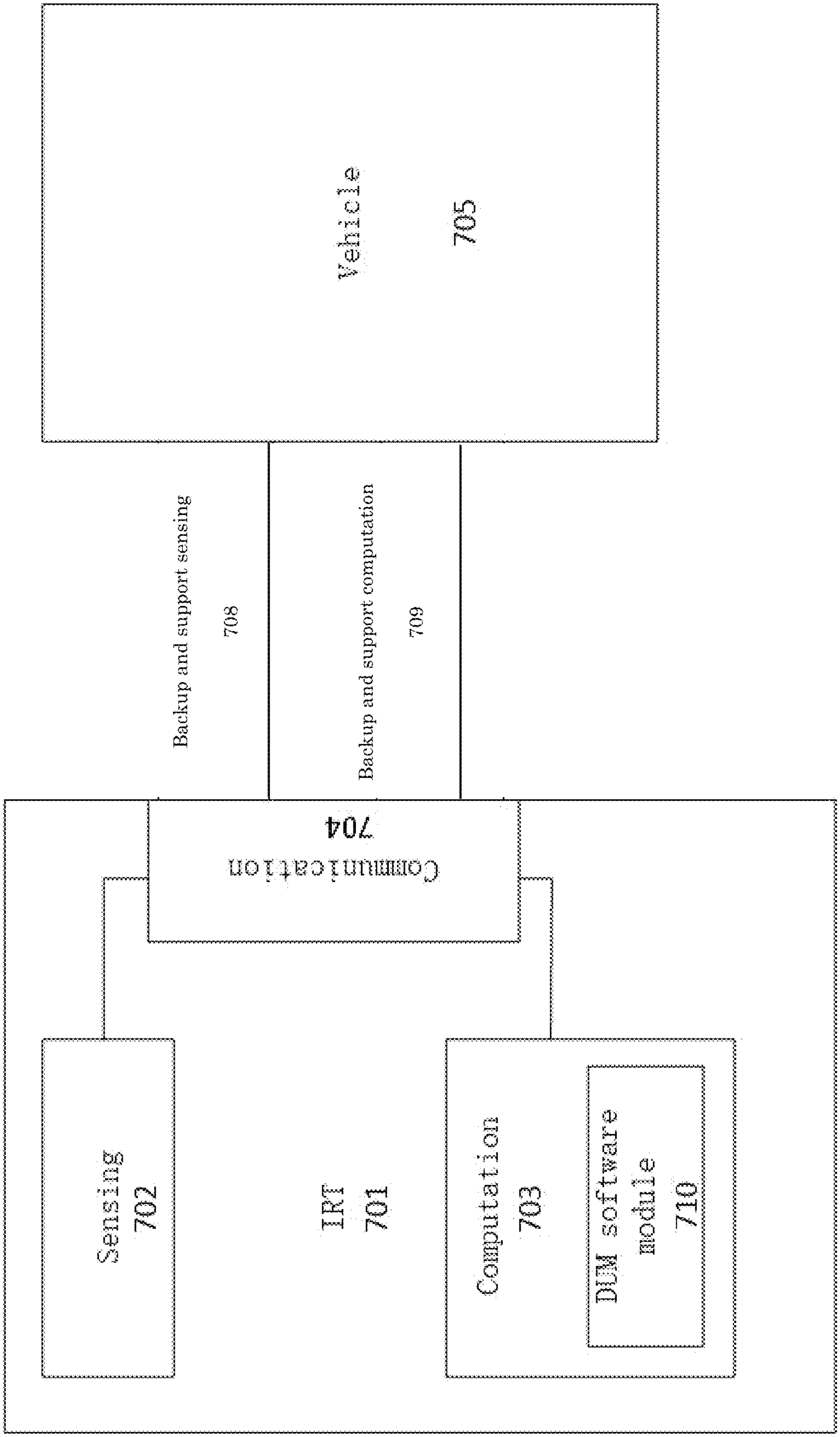
FIG. 7 is a schematic drawing showing IRT-supported sensing and communication backup.
Figure 8:
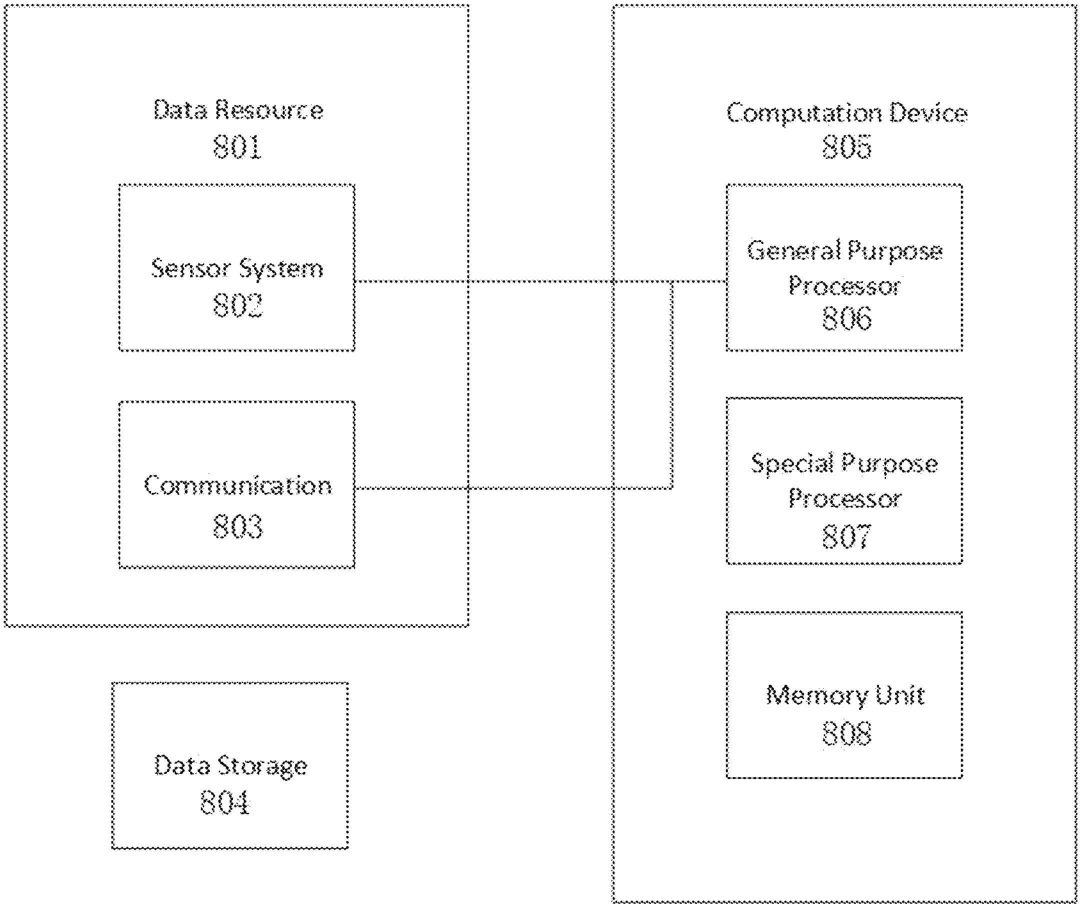
FIG. 8 is a schematic drawing showing an exemplary use of an IRT at an intersection to provide traffic safety and provide control instructions to a connected and automated vehicle.

In some embodiments, e.g., as shown in FIG. 5 and FIG. 6, the IRT comprises one or more hardware and/or software modules. For example, in some embodiments, the IRT comprises hardware modules 504 that provide sensing 501 (e.g., a sensing module), communication 502 (e.g., a communication module), and computation 503 (e.g., a computation module). In some embodiments, the sensing module 501 connects with a communication module 502 and a computation module 503. In some embodiments, the computation module 503 connects with the sensing module 501 and the communication module 502. In some embodiments, the IRT comprises software modules, e.g., sensing software 601 and planning software 602 (e.g., DUM software module 710 of FIG. 7). In some embodiments, the sensing software 601 provides object detection 603 and object tracking 604. In some embodiments, the planning software 602 provides path planning 605, route planning 606, and production of plans for special events or conditions 607 (e.g., weather conditions, natural disasters, traffic accident, sports event, etc.) In some embodiments, e.g., as shown in FIG. 7, the IRT 701 provides backup (e.g., supplemental) sensing 708 and computation support 709 for CAVs 705. In some embodiments, the backup (e.g., supplemental) sensing 708 and computation support 709 is provided to a CAV 705 using communication channels 704. In some embodiments, e.g., as shown in FIG. 8, the IRT provides computation support for CAVs. In some embodiments, the computation support is provided to a CAV with computation support from the IRT. In some embodiments, the IRT comprises sensors 802 (e.g., LIDAR, camera, satellite navigation (e.g., GPS, differential GPS, BeiDou, GLONASS), RFID, inertial measurement unit (IMU), and/or radar); a communications device 803 (e.g., DSRC, WiFi (e.g., IEEE 802.11), 4G/5G, and/or Bluetooth); and/or a computation device 805 (e.g., a CPUs and/or GPU).

Although the disclosure herein refers to certain illustrated embodiments, it is to be understood that these embodiments are presented by way of example and not by way of limitation.

EXAMPLE

Figure 9:
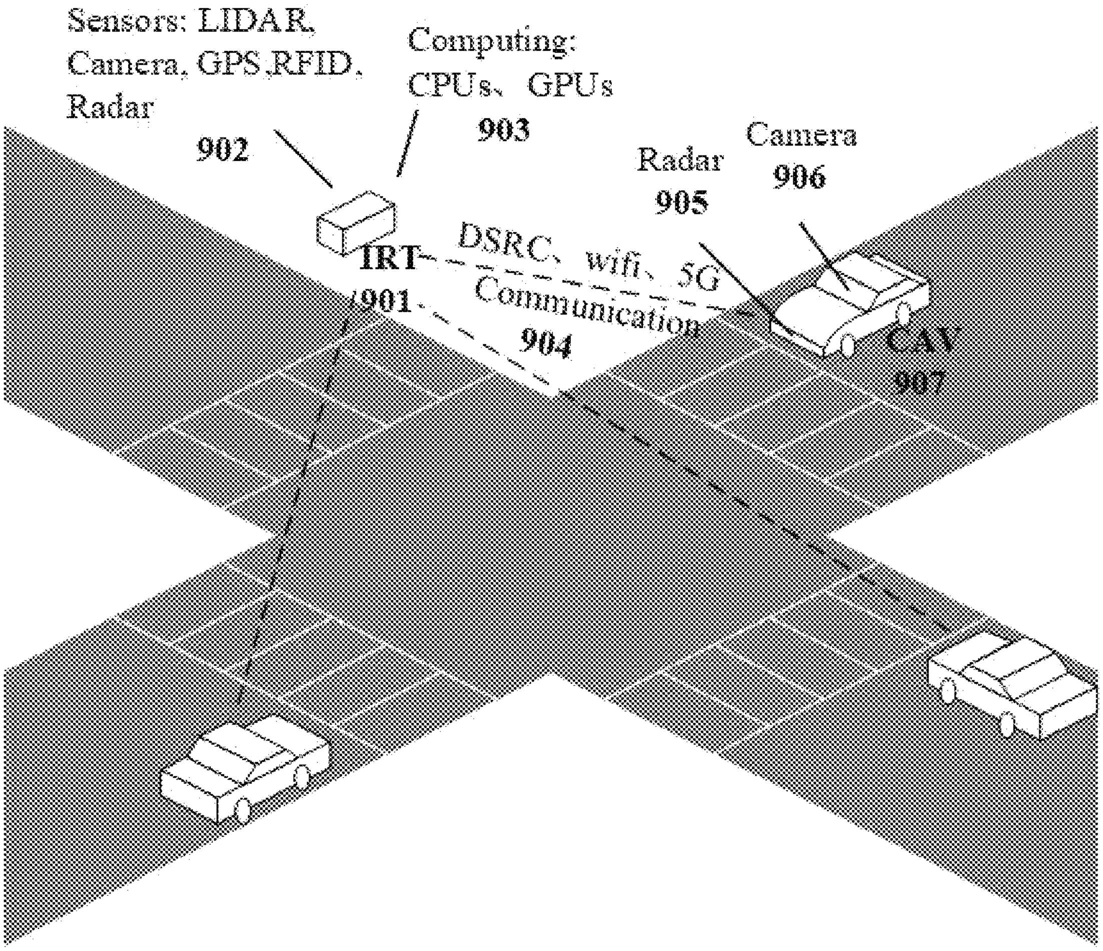
FIG. 9 is a schematic drawing of vehicles approaching an intersection comprising an IRT.

An IRT comprising sensors (e.g., LIDAR, camera, GPS, RFID, Radar), a communication device (e.g., DSRC, Wi-Fi, 5G), and a computation device (e.g., one or more CPUs and/or GPUs) is deployed next to an intersection (see, e.g., FIG. 9). Roadside information is collected by IRT sensors. The dynamic utility management (DUM) module is installed in the CAVs and the DUM maintains the optimal utility (e.g., cost) in real-time for CAVs at various vehicle intelligence levels. When the DDS system detects that a vehicle cost function value (e.g., representing the generalized cost of automated driving) exceeds a specified threshold (e.g., due to factors such as previously identified obstacles; a CAV component, function, or service failure; increasing complexity of the environment; etc.), the DUM makes a request to the IRT, which then provides corresponding services to the CAV to maintain the optimal cost.

In some embodiments shown in FIG. 9, when a CAV 907 approaches the intersection, data describing the driving environment are collected by CAV exterior sensors and fused with data from CAV interior sensors. Meanwhile, the CAV 907 sends a request to the IRT 901 for supplemental information (e.g., describing the behavior (e.g., position, velocity, and/or acceleration) of surrounding vehicles and/or pedestrians) and/or sensing assistance, e.g., due to CAV exterior sensors being blocked and/or being incapable of providing full and/or sufficient description of the CAV environment. The IRT 901 then sends roadside sensor data to the CAV 907 (e.g., using one or more communication modules or systems) in real-time according to the CAV requests. The CAV 907 subsequently performs the prediction, planning, and decision-making processes based on sensing data (from both CAV and IRT sensors 902, 905, 906) and additional services provided by IRT 901 if the DUM determines further IRT assistance is needed. The CAV control module then performs vehicle control functionality (e.g., to control movement of the CAV (e.g., acceleration, deceleration, turning, braking, etc.)) based on the control instructions. Therefore, vehicle performance (e.g., computational ability, vehicle emission, energy economy, driver comfort) is optimized under the premise of ensuring traffic safety.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. An automated driving system with distributed computing (ADS-DC) comprising:

a) a vehicle onboard system in a connected and automated vehicle (CAV), which is configured to conduct sensing and decision-making, and generate control instructions for automated driving of the CAV;

b) an intelligent roadside toolbox (IRT), wherein said IRT provides customized, on-demand, and dynamic computing resources and functions to the CAV; and c) a communications media for transmitting data between said CAV and said IRT, wherein said IRT computing resources and functions are configured to support the CAV's sensing functions, prediction and management functions, planning and decision-making functions, and vehicle control functions.

2. The system of claim 1, wherein said IRT resources and functions are provided by a cloud.

3. The system of claim 1, wherein the IRT provides computing resources and functions for the CAV to avoid trajectory conflicts with other vehicles and/or to adjust vehicle route and/or trajectory for driving environments including snow, sleet, fog or other adverse weather or road conditions.

4. The system of claim 1, wherein the IRT computing resources and functions improve safety and stability of the CAV by assembling IRT computing resources and providing IRT computing resources and functions to the CAV.

5. The system of claim 1, wherein the IRT computing resources and functions supplement the CAV according to vehicle manufacturer designs to improve CAV performance.

6. The system of claim 1, wherein said system is configured to provide supplemental computing resources and functions to the CAV in response to a value of a vehicle cost exceeding a threshold and/or in response to detecting a component, function, and/or service failure.

7. The system of claim 1, wherein said IRT is configured to provide a customized computing service for vehicle manufacturers and/or driving services providers, said customized computing service comprising computing functions for remote-control service, pavement condition detection, and/or pedestrian prediction.

8. The system of claim 1, wherein said IRT is configured to receive information from a vehicle OBU, electronic stability program (ESP), and/or vehicle control unit (VCU).

9. The system of claim 1, wherein the IRT computing functions provide the computation support for sensing function, prediction function, planning function, decision-making function, and/or control function of said CAV.

10. The system of claim 9, configured to integrate sensor and/or driving environment information from different resources to provide integrated sensor and/or driving environment information and pass said integrated sensor and/or driving environment information to a prediction module.

11. The system of claim 9, wherein said sensing comprises providing information in real-time, short-term, and/or long-term for transportation behavior prediction and management, planning and decision-making, and/or vehicle control.

12. The system of claim 9 wherein said prediction functions provide:

i) prediction support comprising providing raw data and/or providing features extracted from raw data; and/or ii) a prediction result, wherein the prediction support and/or a prediction result is/are provided to the CAV based on the prediction requirements of said CAV.

13. The system of claim 9, wherein said prediction functions predict a behavior of surrounding vehicles, pedestrians, bicycles, and/or other moving objects.

14. The system of claim 9, wherein said planning and decision-making functions provide:

i) path planning comprising identifying and/or providing a detailed driving path at a microscopic level for automated driving of the CAV;

ii) route planning comprising identifying and/or providing a route for automated driving of the CAV;

iii) special condition planning comprising identifying and/or providing a detailed driving path at a microscopic level and/or a route for automated driving of the CAV during special weather conditions or event conditions; and/or iv) disaster solutions comprising identifying and/or providing a detailed driving path at a microscopic level and/or a route for automated driving of the CAV during a disaster.

15. The system of claim 9, wherein said vehicle control functions are configured to determine a computation resource supporting automated driving of the CAV and request and/or provide supplemental computation resources from said IRT.

16. An automated driving system with distributed computing (ADS-DC) comprising:

a) a vehicle onboard system in a connected and automated vehicle (CAV), which is configured to conduct sensing and decision-making, and generate control instructions for automated driving of the CAV; and c) a communications media for transmitting data between said CAV and an intelligent roadside toolbox (IRT), wherein the communications media communicates with the IRT;

wherein said IRT provides customized, on-demand, and dynamic computing resources and functions to the CAV; and wherein said IRT computing resources and functions are configured to support the CAV's sensing functions, prediction and management functions, planning and decision-making functions, and vehicle control functions.

17. The system of claim 16, wherein said IRT resources and functions are provided by a cloud.

18. The system of claim 16, wherein said system is configured to provide supplemental computing resources and functions to the CAV in response to a value of a vehicle cost exceeding a threshold and/or in response to detecting a component, function, and/or service failure.

19. The system of claim 16, wherein the IRT computing functions provide the computation support for sensing function, prediction function, planning function, decision-making function, and/or control function of said CAV.

20. The system of claim 19, wherein said prediction functions predict a behavior of surrounding vehicles, pedestrians, bicycles, and/or other moving objects.

* * * * *